(12) United States Patent
Madisetti et al.

(10) Patent No.: US 8,356,141 B2
(45) Date of Patent: Jan. 15, 2013

(54) IDENTIFYING REPLACEMENT MEMORY PAGES FROM THREE PAGE RECORD LISTS

(75) Inventors: Prashanth Madisetti, San Jose, CA (US); Dan Truong, Cupertino, CA (US); Srisailendra Yallapragada, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 309 days.

(21) Appl. No.: 12/825,163

(22) Filed: Jun. 28, 2010

(65) Prior Publication Data

US 2011/0320747 A1 Dec. 29, 2011

(51) Int. Cl.
*G06F 12/00* (2006.01)
*G06F 13/00* (2006.01)
*G06F 13/28* (2006.01)

(52) U.S. Cl. .................... 711/134; 711/118; 711/159

(58) Field of Classification Search .................. 711/118, 711/133–136, 159–160
See application file for complete search history.

(56) References Cited

U.S. PATENT DOCUMENTS

| | | | |
|---|---|---|---|
| 7,543,124 B1 | 6/2009 | Accapadi et al. | |
| 2003/0221069 A1* | 11/2003 | Azevedo et al. | 711/136 |
| 2006/0090036 A1* | 4/2006 | Zohar et al. | 711/133 |
| 2007/0168627 A1* | 7/2007 | In et al. | 711/159 |

\* cited by examiner

*Primary Examiner* — Jared Rutz
*Assistant Examiner* — Ryan Bertram

(57) ABSTRACT

A replacement memory page is identified by accessing a first list of page records, and if the first list is not empty, identifying a replacement page from a next page record indicator of the first list. A second list of page records is accessed if the first list is empty, and if the second list is not empty, the replacement page is identified from a next page record indicator of the second list. A third list of page records is accessed if the first and second lists are empty, and the replacement page is identified from a next page record indicator of the third list.

15 Claims, 4 Drawing Sheets

IDENTIFYING REPLACEMENT MEMORY PAGES FROM THREE PAGE RECORD LISTS

BACKGROUND

In the art of computing, a processor architecture has an address space that is typically larger than the amount of physical memory present in a computer having one or more of the processors implementing the processor architecture. The address space of the processor is virtualized. To manage translations from the virtual address space of the processor to the physical memory, a virtual memory system is used. The virtual memory system stores memory translations in a page table. In a paging memory management scheme, the operating system retrieves data from persistent storage in blocks called pages.

At some point, as memory pages are loaded from persistent storage, physical pages that were previously assigned a translation to virtual memory pages must be selected for replacement so that new memory pages may be loaded. Pages that are candidates for replacement may be managed as classes. For example, it is desirable to select an inactive page for replacement before an active page is selected for replacement.

Another technique known in the art is speculatively prefetching read ahead pages asynchronously from persistent storage into physical memory. Performance is increased because if a page is speculatively prefetched and is later needed, the page is already in memory and processing can continue without the need to fetch the page from persistent storage.

BRIEF DESCRIPTION OF THE DRAWINGS

The Figures depict embodiments, examples, implementations, and configurations of the invention, and not the invention itself.

DETAILED DESCRIPTION

In the foregoing description, numerous details are set forth to provide an understanding of the present invention. However, it will be understood by those skilled in the art that the present invention may be practiced without these details. While the invention has been disclosed with respect to a limited number of embodiments and examples, those skilled in the art will appreciate numerous modifications and variations therefrom. It is intended that the appended claims cover such modifications and variations as fall within the true spirit and scope of the invention.

Examples of the present invention relate to paging performance in virtual memory systems. More specifically, examples of the invention maintain separate lists for different classes of memory pages, such as active pages, inactive pages, and read ahead pages, thereby allowing inactive pages to be given priority over read ahead pages when page replacement is required, while minimizing the need to search pages to find a page suitable for page replacement.

Figure 1:
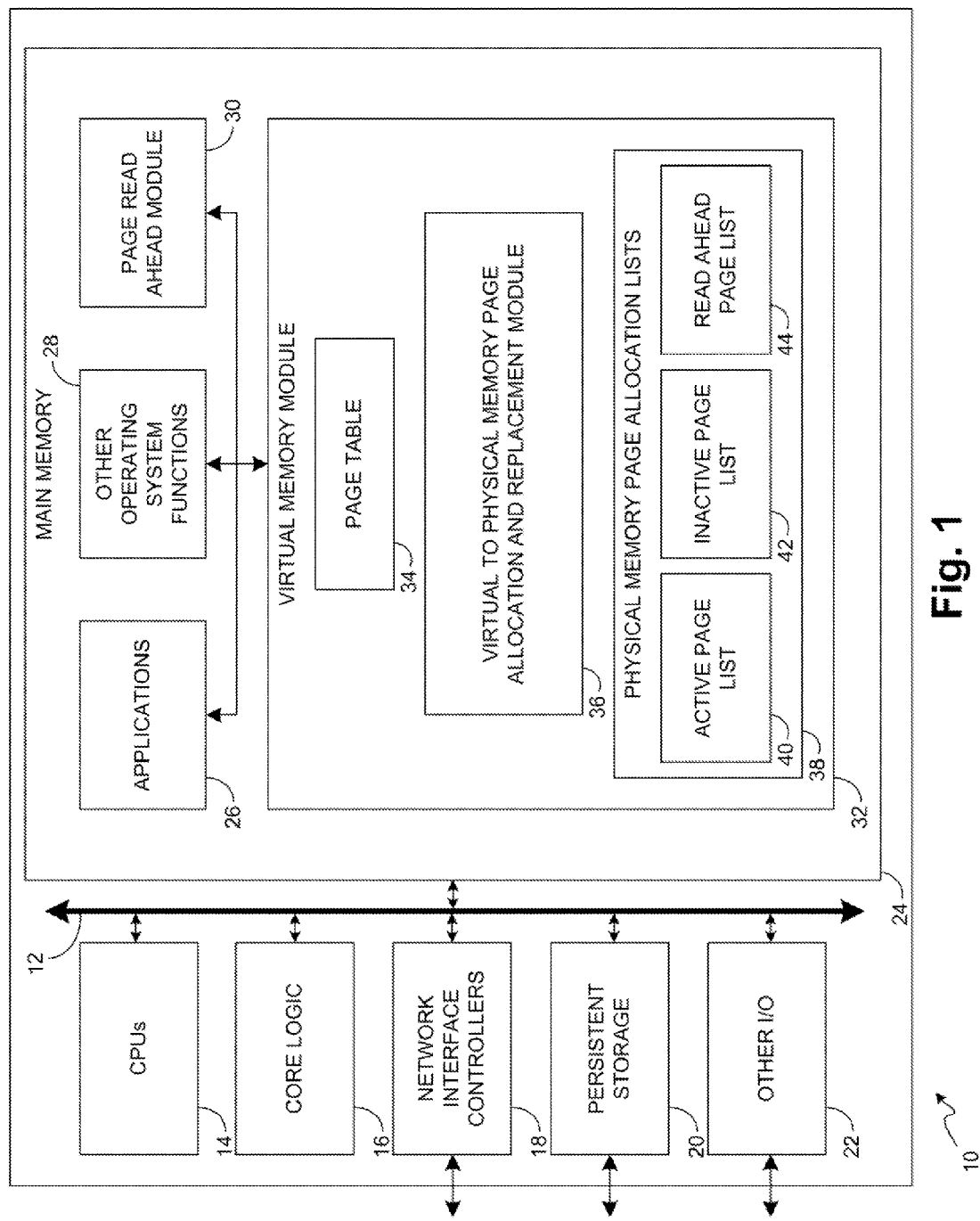
FIG. 1 is a block diagram of computer system that includes memory page allocations lists, in accordance with examples of the present invention.

FIG. 1 is a block diagram of computer system 10 that includes examples of the present invention. Computer system 10 includes a bus 12. Coupled to bus 12 are one or more CPUs 14, core logic 16, network interface controllers 18, persistent storage 20, other I/O 22, and main memory 24.

Although bus 12 is shown generically as a single bus, those skilled in the art will recognize that typically a variety of busses and fabrics are used to connect the components shown in FIG. 1. CPUs 14 may represent a single CPU, multiple CPUs in individual integrated circuit (IC) packages, multiple CPU cores in a discrete IC package, or any combination of these elements. Core logic 16 represents the core logic that couples CPUs 14, main memory 24, network interface controllers 18, persistent storage 20, and other I/O 22. In some architectures, core logic 16 includes a Northbridge and a Southbridge. However, other architectures are known in the art. For example, in some architectures, the memory controller is provided in the CPU.

Persistent storage 20 represents storage used to store local copies of the operating system, executables, and data. Persistent storage 20 may represent devices (and appropriate corresponding media) such as hard disk drives, solid state drives, tape drives, optical drives, floppy drives, and the like. Persistent storage 20 may represent storage devices that are local to computer system 10, or remote storage devices, such as disk array subsystems coupled to computer system 10 via a storage area network (SAN).

Network interface controllers 18 may be coupled to a local area network (LAN) or wide area network (WAN). Note that the network interface controllers may also provide a path to network attached persistent storage.

Other I/O 22 includes other I/O components found in a typical computer system, such as USB ports, video controllers, and interfaces to keyboards, mice, speakers, and the like. Note that it is common to integrate many of these I/O functions, along with video controllers, network interface controllers, and storage controllers, with the core logic.

In FIG. 1, main memory 24 is shown with various data structures and program code that may be present in main memory 24, in accordance with examples of the present invention. Note that portions of the contents of main memory 24 may also reside in cache memories of CPUs 14 or core logic 16, and in a translation lookaside buffer (TLB) of CPUs 14.

Main memory 24 includes applications 26, other operating system functions 28, page read ahead module 30, and virtual memory module 32. Applications 26 represent applications that are executed by computer system 10. Applications may read and write data to memory, launch other applications, and perform other functions known in the art. Other operating system functions 28 represent functions performed by an operating system, except for page read ahead functions and virtual memory functions, which are performed by page read ahead module 30 and virtual memory module 32, respectively.

Page read ahead module 30 prefetches read ahead pages into memory. Prefetching pages increases system performance by predicting when pages will be needed from persistent storage before the pages are actually needed, and loading the pages from persistent storage into main memory 24. For example, when an operating system, is booted, applications and operating system modules that will probably be needed later may be prefetched into memory. Similarly, when an application is launched, application code and data that will probably be needed by the application may be prefetched from persistent storage into memory. Also, when executing applications are suspended, it is possible that the application's code may be swapped from physical memory to a page file on persistent storage. When the application resumes execution, pages that were stored to the page file may be prefetched back to physical memory before the pages are actually accessed by the application.

Virtual memory module 32 includes page table 34, virtual to physical memory page allocation and replacement module 36, and physical memory page allocation lists 38. In accordance with examples of the present invention, physical memory page allocation lists 38 include an active page list 40, an inactive page list 42, and a read ahead page list 44. Lists 40, 42, and 44 will be described in greater detail below with reference to FIGS. 2 and 3.

Page table 34 stores virtual to physical memory translations. When an application or the operating system seeks to access a virtual page, page table 34 translates the virtual page address to a physical page address. Note that some of the translations in page table 34 may be stored in translation lookaside buffers (TLBs) of CPUs 14. In essence, the TLBs cache frequently used translations in the CPUs so that the CPUs do need to access main memory to determine the translation.

Physical memory page allocation and replacement module 36 manages the allocation and replacement of physical pages to virtual pages. For example, if all physical pages have been allocated, and an application or page read ahead module 30 seeks to read additional pages from persistent storage to main memory, module 36 must determine which current page translations may be replaced. To identify the page translations that may be replaced, module 36 uses physical memory page allocations lists 38.

Figure 2:
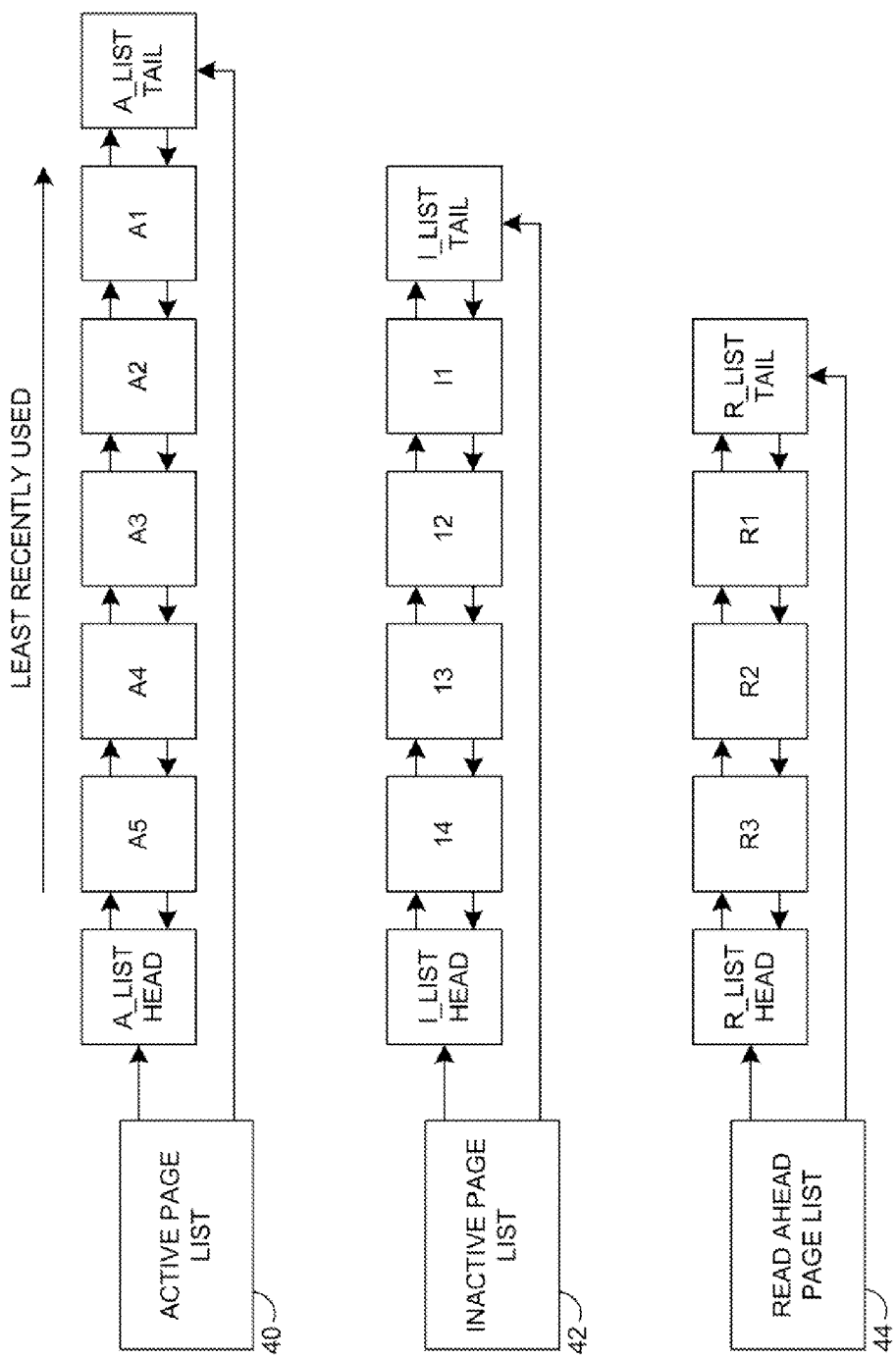
FIG. 2 shows the memory page allocations lists of FIG. 1 in greater detail, in accordance with examples of the present invention.

FIG. 2 shows physical memory page allocations lists 38 of FIG. 1 in greater detail. Each of the lists has a list head and a list tail. Page records are stored between the list head and the list tail as two-way linked lists arranged in least recently used (LRU) order. Note that other orders; such as an order based on a priority assignment, may be used. If a list is empty, the list head may be linked to the list tail. Also note that it is possible to implement the lists as one-way linked lists, which reduces the overhead needed to store the links in each page record.

As shown in FIG. 2, active page list 40 has an A_List Head, which is linked to page record A5, which in turn is linked to page record A4, which in turn is linked to page record A3, which in turn is linked to page record A2, which in turn is linked to page record A1, which in turn is linked to an A_List Tail. Inactive page list 42 has an I_List Head, which is linked to page record I4, which in turn is linked to page record I3, which in turn is linked to page record I2, which in turn is linked to page record I1, which in turn is linked to an I_List Tail. Finally, read ahead page list 44 has an R_List Head, which is linked to page record R3, which in turn is linked to page record R2, which in turn is linked to page record R1, which in turn is linked to an R_List Tail. Note that a small number of page records are shown in FIG. 2 to illustrate examples of the present invention. In a typical implementation, pages may vary in size from kilobytes to gigabytes, but total system memory will typically comprise many gigabyte or terabytes. Accordingly, the number of page records may vary from thousands to millions or more.

Active pages are pages that are currently being used by applications 26 or other operating system functions 28 of FIG. 1. Inactive pages are pages that are not actively in use. Pages may be marked inactive when an application has terminated, an application ceases using them, or may be marked for replacement by a heuristic that selects them for demotion, such as a routine that scans active pages that have not been used for a specified period of time and moves the page records from active page list 40 to inactive page list 42.

Read ahead pages are pages that have been speculatively prefetched by page read ahead module 30 of FIG. 1. Since read ahead pages are prefetched based on a prediction that the pages will be needed, and not because they have been explicitly requested, they are not active when prefetched. In some previous implementations, prefetched read ahead pages are managed as inactive pages along with pages that have been explicitly marked as inactive. The inactive pages can be sorted, for example based on LRU order. Managing read ahead pages with inactive pages is inefficient, because a read ahead page may be replaced before another page that was explicitly determined to be inactive, and if the read ahead page that was replaced is needed later, it must be fetched from persistent storage again.

Typically it is desirable to keep pages explicitly determined to be inactive in memory because it is still possible that the page may be needed again, and keeping the page in memory avoids having to access persistent storage to refetch the page. However, it is expected that the likelihood that a read ahead page will be needed in the near future is higher than the likelihood that an inactive page will be needed in the near future. Therefore, overall page fetches to persistent storage are reduced by selecting inactive pages for replacement before read ahead pages.

In a previous page management scheme, read ahead pages are flagged as read ahead pages, but are stored in the inactive page list and sorted with inactive pages in LRU order. While such a scheme allows an inactive page to be selected for replacement before a read ahead page, the list must be searched for inactive page records before a read ahead page record is selected for replacement. If the inactive list contains many read ahead page records in sequence linked to the list tail, all the read ahead page record must be searched before identifying an inactive page record. Searching the list is inefficient, and delays the page replacement operation.

In accordance with examples of the present invention, a separate read ahead page list 44 is provided. By providing a separate read ahead page list, examples of the present invention allow page replacement algorithms to select an inactive page first, while minimizing the searching required for a replacement page to be identified. Stated broadly, examples of the present invention provide a separate list of page records for each class of pages for which discrimination is desired. In FIGS. 1 and 2, and in FIG. 3 discussed below, a first class is inactive pages, a second class is read ahead pages, and a third class is active pages.

When page replacement is performed, examples of the present invention identify a page for replacement by quickly and successively looking at each list for a page record. For example, when virtual to physical memory page allocation and replacement module 36 needs to identify a page for replacement, module 36 first looks at inactive page list 42. If list 42 includes a page record, the page is removed from the tail of list 42 and is assigned to the new virtual page. The page record is then inserted at the head of active page list 40 if the page is active, or is inserted at the head of read ahead page list 44 if the page is a read ahead page. If inactive page list 42 is empty, module 36 looks at read ahead page list 44 to identify a page at the tail of list 44. If read ahead page list 44 is empty, module 36 identifies a page from the tail of active page list 40. The searching required by module 36 is limited by the number of page classes, so in the examples shown in FIGS. 1 and 2, a replacement page is identified by looking at the tails of a maximum of three lists. In contrast, prior solutions either do not give priority to read ahead pages, or require that a list be searched to find an inactive page before selecting a read ahead page for replacement.

Note that as pages are prefetched by page read ahead module 30, the pages are inserted at the head of read ahead page list 44. A heuristic routine may be used to scan periodically read ahead page list 44 for pages that have aged significantly since being prefetched and have not been used. Since prefetching is speculative, some pages that are prefetched may not be needed, and the heuristic can identify such pages and move the pages to inactive page list 42, where the pages will be given priority for replacement. Such a mechanism can be implemented outside of the performance critical path to ensure that unused read ahead pages are demoted to the inactive list for reuse to avoid the inactive list becoming empty. On a system under stress, inactive pages are first identified as candidates for replacement, followed by read ahead pages, and finally active pages.

In the example shown in FIG. 2, linked lists are used to implement a least recently used replacement algorithm. However, other data structures that do not require excessive searching may be used. For example, various queue, table, or tree structures may be used, with an indicator pointer to identify the next page record available for replacement for each class. Furthermore, different replacement algorithms may be used. For example, a random algorithm may be used, or a more sophisticated algorithm that also includes the priority of the process associated with inactive or read ahead page, or a page use count. Many such data structures and algorithms are known in the art, and those skilled in the art will appreciate how to adapt the examples of the present invention disclosed herein to implement a page replacement algorithm that differentiates between inactive pages and read ahead pages, while minimizing searching required to identify a page replacement candidate.

Figure 3:
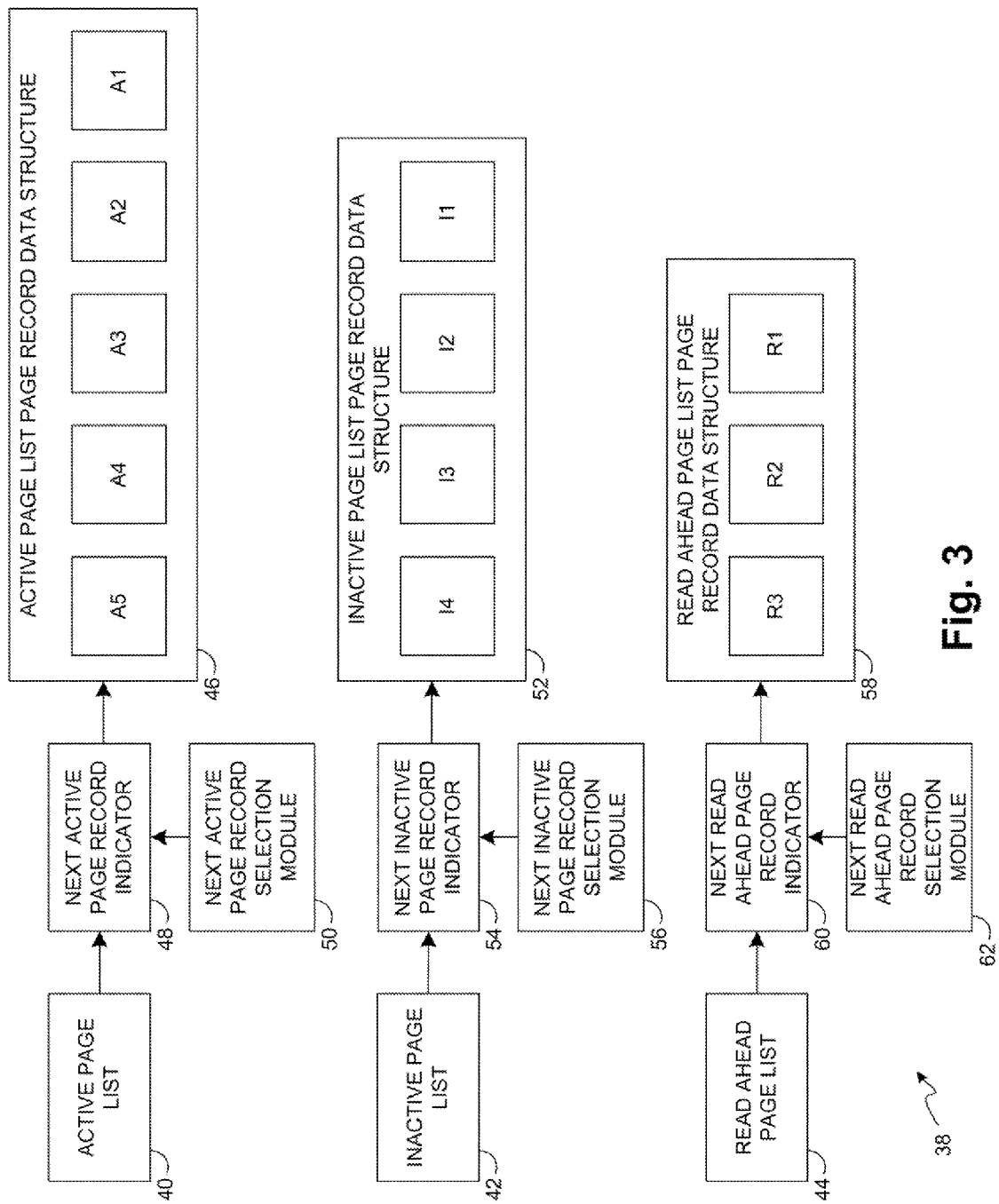
FIG. 3 shows a more generic example of the physical memory page allocations lists of FIG. 1, in accordance with examples of the present invention.

FIG. 3 shows a more generic example of the physical memory page allocations lists 38 of FIG. 1. In FIG. 3, physical memory page allocations lists 38 includes active page list 40, inactive page list 42, and read ahead page list 44. Active page list 40 includes active page list record data structure 46 (shown storing page records A5, A4, A3, A2, and A1), next active page record indicator 48, and next active page record selection module 50. Inactive page list 42 includes inactive page list record data structure 52 (shown storing page records 14, 13, 12, and 11), next inactive page record indicator 54, and next inactive page record selection module 56. Finally, read ahead page list 44 includes read ahead page list record data structure 58 (shown storing page records R3, R2, and R1), next read ahead page record indicator 60, and next read ahead page record selection module 62.

The page record data structures 46, 52, and 58 represent any suitable data structure for storing page records. As shown in FIG. 2, one suitable data structure is a linked list, but other data structures known in the art may also be used, such as the data structures discussed above.

The next page record indicators 48, 54, and 60 represent a data field or data structure that identities the next page record for replacement for the class associated with each list. In FIG. 2, the list tails of the linked lists perform this function. However, other page record indicators appropriate for the page record data structure used to implement examples of the present invention may be used. For example, a pointer may be used to point to a record in a binary tree structure, table, queue, array, or other suitable data structure.

Finally, the page record selection modules 50, 56, and 62 represent the algorithms and manipulations of the page record data structures 46, 52, and 58 required to queue up the next page records for the next page record indicators 48, 54, and 60. In FIG. 2, this function is performed for the LRU algorithm by inserting new page records at the list head, and ensuring that the next page record to be replaced for each page list is linked to the list tail. However, as discussed above, other algorithms may be used. For example, if a random selection algorithm is used, the page record selection modules 50, 56, and 62 random select the next page record from the page record data structures 46, 52, and 58, and store an indicator for the selected page record in the page record indicators 48, 54, and 60, respectively. Similarly, algorithms that use process priority or page counts may be used to select the next page record for replacement, and store the next page for replacement in next page record indicators 48, 54, and 60.

Figure 4:
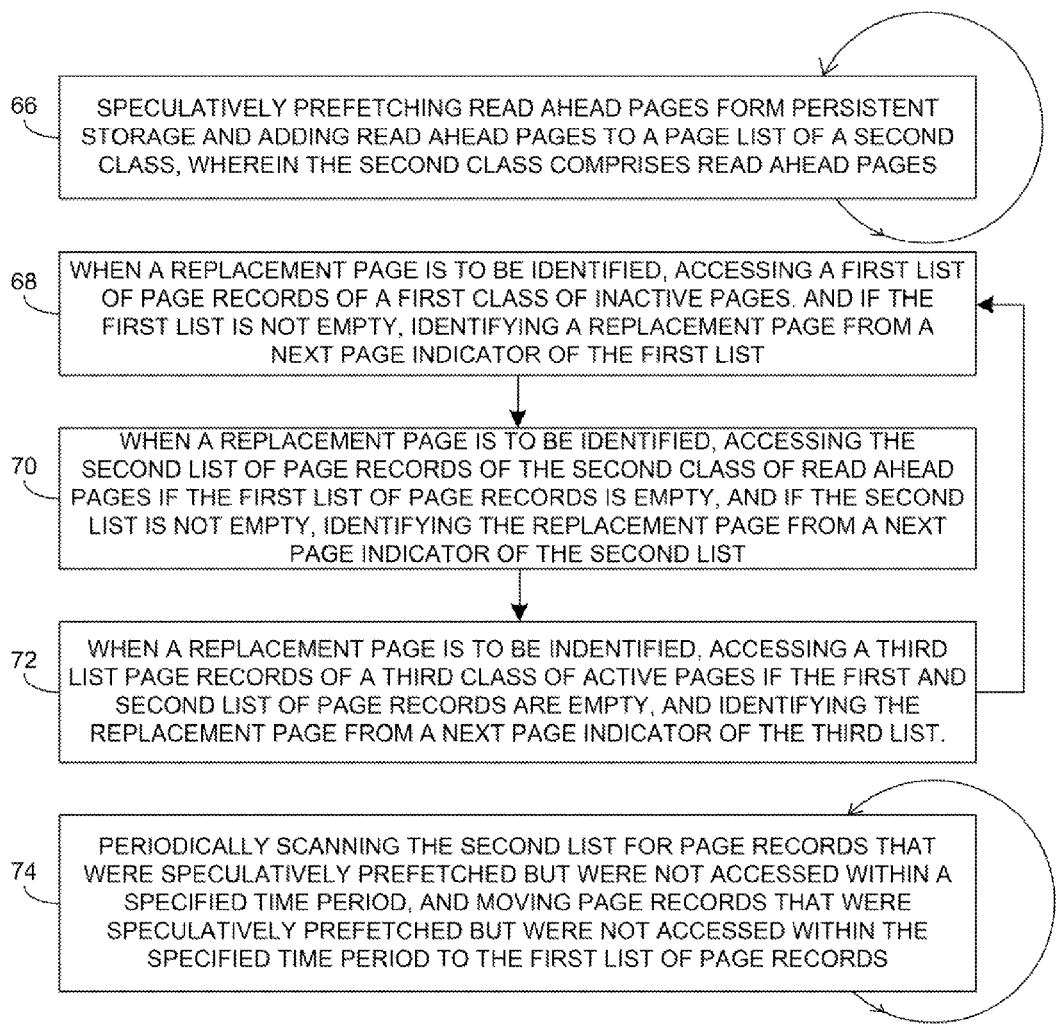
FIG. 4 is a flowchart that illustrates examples of the present invention.

FIG. 4 shows a flowchart 64 that illustrates examples of the present invention. Flowchart 64 does not show all functional blocks required to manage virtual to physical memory translations. Rather, flowchart 64 only shows blocks needed to understand examples of the present invention. For illustrative purposes, flowchart 64 is shown as three threads, but those skilled in the art will recognize that portions of flowchart 64 may be implemented in additional threads and contexts.

At block 66, read ahead pages are speculatively fetched from persistent storage 20 by page read ahead module 30 of FIG. 1. As the pages are fetched, page records identifying the pages are stored in read ahead page list 44. Read ahead pages are defined as pages of a second class.

Blocks 68, 70, and 72 show how a page is selected for replacement, in accordance with examples of the present invention. Each block 68, 70, and 72 represents accessing one of the page lists 42, 44, and 40, respectively. At block 68, when a replacement page is to be identified, inactive page list 42 is accessed. If inactive page list 42 is not empty, the replacement page is identified from next inactive page record indicator 54 of FIG. 3. In FIG. 2, the next inactive page record indicator is the I_List Tail of inactive page list 42. Control passes to block 70.

Block 70 determines whether inactive page list 42 is empty. If it is, read ahead page list 44 is accessed. If read ahead page list 44 is not empty, the replacement page is identified from next read ahead page record indicator 60 of FIG. 3. In FIG. 2, the next read ahead page record indicator is the R_List Tail of read ahead page list 44. Control passes to block 72.

Block 72 determines whether inactive page list 42 and read ahead page list 44 are both empty. If both are empty, the replacement page is identified from next active page record indicator 48 of FIG. 3. In FIG. 2, the next active page record indicator is the A_List Tail of active page list 40. At this point, the replacement page has been identified. Note that the replacement was identified based on a priority of inactive pages, read ahead pages, and active pages, and no additional searching for a replacement page is needed. Control passes to block 68 for the next page replacement request.

Block 74 represents a heuristic routine that scans the read ahead page list for pages that were speculatively prefetched, but not needed after a specified time interval. The heuristic routine may be executed periodically at a relatively low priority, and may be executed relatively infrequently, such as every few seconds, and may be executed in an independent thread or context. Note that the priority and frequency may be adjusted based on other metrics. For example, if the number of page records in inactive page list is low, the heuristic routine may be executed more frequently at a higher priority to move more page records from read ahead page list 44 to inactive page list 42. Conversely, if there are sufficient page records in inactive page list 42 to service page replacement requests, the heuristic routine may be executed less frequently and read ahead pages may remain in the read ahead page list longer.

Similarly, the specified time period used to define when an old read ahead page should be moved to inactive page list 42 may be adjusted. For example, pages that were speculative prefetched and were not used for two minutes may be moved from read ahead page list 44 to inactive page list 42. If inactive page list 42 has a low number of page records, the specified time period may be decreased, and if inactive page list 42 has sufficient page records to service page replacement requests, the specified time period may be increased.

Examples of the present invention improve memory page management in virtual memory systems. Inactive pages are selected for replacement before read ahead pages, and in turn, read ahead pages are selected for replacement before active pages. Furthermore, examples of the present invention identify replacement pages efficiently without the need to search page lists. Each list, in priority order, need only be accessed once to determine whether a replacement page is available, with the next page indicator of each list identifying a candidate replacement page from the list without searching the list.

In the foregoing description, numerous details are set forth to provide an understanding of the present invention. However, it will be understood by those skilled in the art that the present invention may be practiced without these details. While the invention has been disclosed with respect to a limited number of examples and embodiments, those skilled in the art will appreciate numerous modifications and variations therefrom. It is intended that the appended claims cover such modifications and variations as fall within the true spirit and scope of the invention.

What is claimed is:

1. A method of managing memory pages comprising:
   accessing a first list of page records of a first class, and if the first list is not empty, identifying a replacement page from a next page record indicator of the first list;
   accessing a second list of page records of a second class if the first list is empty, and if the second list is not empty, identifying the replacement page from a next page record indicator of the second list; and
   accessing a third list of page records of a third class if the first and second lists are empty, and identifying the replacement page from a next page record indicator of the third list;
   wherein the first class comprises inactive pages, the second class comprises read ahead pages, and the third class comprises active pages.

2. The method of claim 1 wherein the second class comprises read ahead pages, and further comprising:
   speculatively prefetching read ahead pages from persistent storage into memory; and
   adding read ahead page records to the second list.

3. The method of claim 1 wherein the first class comprises inactive pages and the second class comprises read ahead pages, and further comprising:
   periodically scanning the second list for page records that were speculatively prefetched but were not accessed within a specified time period; and
   moving page records that were speculatively prefetched but were not accessed within the specified time period from the second list to the first list.

4. The method of claim 1 wherein the first list, the second list, and the third list each comprise a linked list of page records, and the next page record indicator of each list comprises a list tail.

5. The method of claim 4 wherein the first list, the second list, and the third list are arranged in least recently used order.

6. A non transitory computer readable media having computer executable program segments stored thereon, the computer executable program segments comprising:
   a virtual to physical memory page replacement module for accessing a first list of page records of a first class, and if the first list is not empty, identifying a replacement page from a next page record indicator of the first list, accessing a second list of page records of a second class if the first list is empty, and if the second list is not empty, identifying the replacement page from a next page record indicator of the second list, and accessing a third list of page records of a third class if the first and second lists are empty, and identifying the replacement page from a next page record indicator of the third list;
   wherein the first class comprises inactive pages, the second class comprises read ahead pages, and the third class comprises active pages.

7. The non transitory computer readable media of claim 6 and further comprising:
   a read ahead page module for speculatively prefetching read ahead pages from persistent storage into memory, and adding read ahead page records to the second list.

8. The non transitory computer readable media of claim 6 wherein the virtual to physical memory page replacement module also periodically scans the second list for page records that were speculatively prefetched but were not accessed within a specified time period, and moves page records that were speculatively prefetched but were not accessed within the specified time period from the second list to the first list.

9. The non transitory computer readable media of claim 6 wherein the first list, the second list, and the third list each comprise a linked list of page records, and the next page record indicator of each list comprises a list tail.

10. The non transitory computer readable media of claim 6 wherein the first list, the second list, and the third list are arranged in least recently used order.

11. A computer system comprising: a CPU for executing program instructions; persistent storage for storing data; and main memory for storing data, the main memory including a virtual to physical memory page replacement module, an active page list, an inactive page list, and a read ahead page list, wherein the virtual to physical memory page replacement module accesses a first list of page records of a first class, and if the first list is not empty, identifies a replacement page from a next page record indicator of the first list, accesses a second list of page records of a second class if the first list is empty, and if the second list is not empty, identifies the replacement page from a next page record indicator of the second list, and accesses a third list of page records of a third class if the first and second lists are empty, and identifies the replacement page from a next page record indicator of the third list, wherein the identified replacement page is moved from main memory to persistent storage;
   wherein the first class comprises inactive pages, the second class comprises read ahead pages, and the third class comprises active pages.

12. The computing system of claim 11 wherein the memory includes a page read ahead module, the second class comprises read ahead pages, and the page read ahead module speculatively prefetching read ahead pages from the persistent storage into main memory and adds read ahead page records to the second list.

13. The computing system of claim 12 wherein the first class comprises inactive pages and the second class comprises read ahead pages, and the virtual to physical memory page replacement module periodically scans the second list for page records that were speculatively prefetched but were not accessed within a specified time period, and moves page records that were speculatively prefetched but were not accessed within the specified time period from the second list to the first list.

14. The computing system of claim 11 wherein the first list, the second list, and the third list each comprise a linked list of page records, and the next page record indicator of each list comprises a list tail.

15. The computing system of claim 14 wherein the first list, the second list, and the third list are arranged in least recently used order.

* * * * *